(12) United States Patent
Girt et al.

(10) Patent No.: US 7,407,720 B2
(45) Date of Patent: Aug. 5, 2008

(54) INTERLAYER DESIGN FOR MAGNETIC MEDIA

(75) Inventors: Erol Girt, Berkeley, CA (US); Alex Rou, Fremont, CA (US); John Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 200 days.

(21) Appl. No.: 10/813,117

(22) Filed: Mar. 31, 2004

(65) Prior Publication Data
US 2005/0084669 A1 Apr. 21, 2005

Related U.S. Application Data

(60) Provisional application No. 60/511,651, filed on Oct. 17, 2003.

(51) Int. Cl.
*G11B 5/66* (2006.01)

(52) U.S. Cl. .................................... 428/831.2

(58) Field of Classification Search ................. 428/831, 428/831.2, 827
See application file for complete search history.

(56) References Cited

U.S. PATENT DOCUMENTS

| | | | |
|---|---|---|---|
| 6,682,834 B2 * | 1/2004 | Okuyama et al. ......... | 428/832.2 |
| 7,211,340 B2 * | 5/2007 | Nolan ...................... | 428/831.2 |
| 2004/0247943 A1 * | 12/2004 | Girt et al. ................ | 428/694 T |
| 2004/0258963 A1 * | 12/2004 | Nolan ................... | 428/694 TS |

* cited by examiner

*Primary Examiner*—Holly Rickman
(74) *Attorney, Agent, or Firm*—Darby & Darby PC

(57) ABSTRACT

A magnetic recording medium having a substrate, an interlayer and a magnetic layer, the interlayer having at least a first intermediary layer, a second intermediary layer and a third intermediary layer, wherein the first intermediary layer or the third intermediary layer is non-magnetic or magnetic and the second intermediary layer has a hexagonal close pack crystal structure and a property of providing RKKY coupling between the first intermediary layer and the third intermediary layer when the first intermediary layer and the second intermediary layer are magnetic layers is disclosed.

26 Claims, 3 Drawing Sheets

4) Top magnetic layer TL

3) $IL_3$

3) $IL_2$

3) $IL_1$

2) Seedlayer and underlayer/s

1) Substrate

4) Top magnetic layer TL

3) $IL_3$

3) $IL_2$

3) $IL_1$

2) Seedlayer and underlayer/s

1) Substrate

INTERLAYER DESIGN FOR MAGNETIC MEDIA

RELATED APPLICATIONS

This application claims benefit from Provisional Application Ser. No. 60/511,651 filed Oct. 17, 2003, the entire disclosure of the above mentioned application is hereby incorporated herein by reference.

FIELD OF INVENTION

The present invention relates to the recording, storage and reading of magnetic data, particularly magnetic recording media having a structure substantially similar to that of anti-ferromagnetically coupled (AFC) media.

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head.

In a magnetic media, digital information (expressed as combinations of "0's" and "1's") is written on tiny magnetic bits (which themselves are made up of many even smaller grains). When a bit is written, a magnetic field produced by the disc drive's head orients the bit's magnetization in a particular direction, corresponding to either a 0 or 1. The magnetism in the head in essence "flips" the magnetization in the bit between two stable orientations.

Magnetic thin-film media, wherein a fine grained polycrystalline magnetic alloy layer serves as the active recording medium layer, are generally classified as "longitudinal" or "perpendicular," depending on the orientation of the magnetic domains of the grains of the magnetic material. In longitudinal media (also often referred as "conventional" media), the magnetization in the bits is flipped between lying parallel and anti-parallel to the direction in which the head is moving relative to the disc. In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

FIG. 1 shows a disk recording medium and a cross section of a disc showing the difference between longitudinal and perpendicular recording. Even though FIG. 1 shows one side of the non-magnetic disk, magnetic recording layers are sputter deposited on both sides of the non-magnetic aluminum substrate of FIG. 1. Also, even though FIG. 1 shows an aluminum substrate, other embodiments include a substrate made of glass, glass-ceramic, NiP/aluminum, metal alloys, plastic/polymer material, ceramic, glass-polymer, composite materials or other non-magnetic materials.

Efforts are continually being made to increase the areal recording density, i.e., the bit density, or bits/unit area, and signal-to-medium noise ratio (SMNR) of the magnetic media. To continue pushing areal densities and increase overall storage capacity, the data bits must be made smaller and put closer together. However, there are limits to how small the bits may be made. If the bit becomes too small, the magnetic energy holding the bit in place may become so small that thermal energy may cause it to demagnetize over time. This phenomenon is known as superparamagnetism. To avoid superparamagnetic effects, disc media manufacturers have been increasing the coercivity (the "field" required to write a bit) of the disc. However, the fields that can be applied are limited by the magnetic materials from which the head is made, and these limits are being approached.

Newer longitudinal recording methods could allow beyond 140 gigabits per square inch in density. A great challenge however is maintaining a strong signal for the bits recorded on the media. When the bit size is reduced, the signal is decreased, making the bits more difficult to detect, as well as more difficult to maintain stable after recording information.

One of the key challenges to extending magnetic recording technology beyond the currently achieved 35-100 Gbit/in$^2$ areal densities is to improve the signal to noise ratio by media noise suppression. It is well known that the longitudinal scaling approach, which is to reduce the media grain surface area in proportion to the bit cell surface area, is limited by the onset of super-paramagnetic instability, which is explained above. Several options exist to avoid this problem. Traditionally, one has compensated the loss in grain volume by increasing the magnetic hardness (anisotropy); however, the write field of the recording head limits this approach. Anti-ferromagnetically coupled (AFC) dual-layer media have offered some relief by increasing the effective media thickness and consequently grain volume without compromising writability. The extendibility of this approach, however, appears to be rather limited. On the other hand, with three times smaller grain diameters, from currently about 9 nm down to about 3 nm, and correspondingly about ten times higher areal densities could be feasible if writing magnetically much harder materials, such as face-centered-tetragonal FePt alloys, can be accomplished.

Thus, one approach to enhancing the areal density in magnetic recording is to reduce the grain-count per bit. This approach could lead to higher media noise and would, among many other things, require significantly improved channel detectors. On the media side, the grain size distribution needs to be trimmed below 10% (sigma over mean), in order to reach grain-counts as low as five to ten grains per bit. Current state-of-the-art sputtered media have grain size distributions of about 25%. Thus, it remains an open challenge to bring out the required improvements in grain size and grain size distribution using physical, thin film sputtering processes. This challenge has been addressed in this invention by the use of a magnetic recording media having a structure substantially similar to that of anti-ferromagnetically coupled (AFC) media.

SUMMARY OF THE INVENTION

This invention preferably relates a magnetic recording medium comprising a substrate, an interlayer and a magnetic layer, the interlayer comprising at least a first intermediary layer, a second intermediary layer and a third intermediary layer, wherein the first intermediary layer or the third intermediary layer is non-magnetic and the second intermediary layer has a hexagonal close pack crystal structure and a property of providing RKKY coupling between the first intermediary layer and the third intermediary layer when the first intermediary layer and the third intermediary layer are magnetic layers. Preferably, the first intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni and combinations thereof. Further preferably, the third intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni and combinations thereof.

One variation comprises a non-oxidized or oxidized NiP layer on the substrate. Preferably, the magnetic layer comprises CoCr or an alloy of CoCr with at least one element selected from the group consisting of Pt, Ta, B, Mo, Ru, Si, Ge, Nb, Fe, Ni and combinations thereof. More preferably, the magnetic layer comprises (a) a Cr-rich layer of $Co_{100-\delta}Cr_{\delta}$ or $Co_{100-\delta}Cr_{\delta}X$, wherein $\delta \geq 15$ and X is an element selected from the group consisting of Pt, Ta, B, Mo, Ru, Si, Ge, Nb, Fe, Ni and combinations thereof, and (b) a Cr-dilute layer of $Co_{100-\delta}Cr_{\delta}$ or $Co_{100-\epsilon}Cr_{\epsilon}Y$, wherein $\delta > \epsilon$ and Y is an element selected from the group consisting of Pt, Ta, B, Mo, Ru, Si, Cu, Ag, Ge, Nb, Fe, Ni and combinations thereof. In one variation, the first intermediary layer has a thickness of less than 1 nm and the second intermediary layer has a thickness of about 0.01 to 3 nm.

Another embodiment is a magnetic recording medium comprising a substrate, an interlayer and a magnetic layer, the interlayer comprising at least a first intermediary layer, a second intermediary layer and a third intermediary layer, wherein the first intermediary layer and the third intermediary layer are magnetic layers, the second intermediary layer has a hexagonal close pack crystal structure and provides RKKY coupling between the first intermediary layer and the third intermediary layer and the magnetic layer comprises a Cr-rich layer and a Cr-dilute layer.

Yet another embodiment is a method of manufacturing a magnetic recording medium comprising depositing an interlayer on a substrate and depositing a magnetic layer on the interlayer, the interlayer comprising at least a first intermediary layer, a second intermediary layer and a third intermediary layer, wherein the first intermediary layer or the third intermediary layer is non-magnetic and the second intermediary layer has a hexagonal close pack crystal structure and a property of providing RKKY coupling between the first intermediary layer and the third intermediary layer when the first intermediary layer and the third intermediary layer are magnetic layers.

Another embodiment is a method of manufacturing a magnetic recording medium comprising depositing an interlayer on a substrate and depositing a magnetic layer on the interlayer, the interlayer comprising at least a first intermediary layer, a second intermediary layer and a third intermediary layer, wherein the first intermediary layer and the third intermediary layer are magnetic layers, the second intermediary layer has a hexagonal close pack crystal structure and provides RKKY coupling between the first intermediary layer and the third intermediary layer and the magnetic layer comprises a Cr-rich layer and a Cr-dilute layer.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
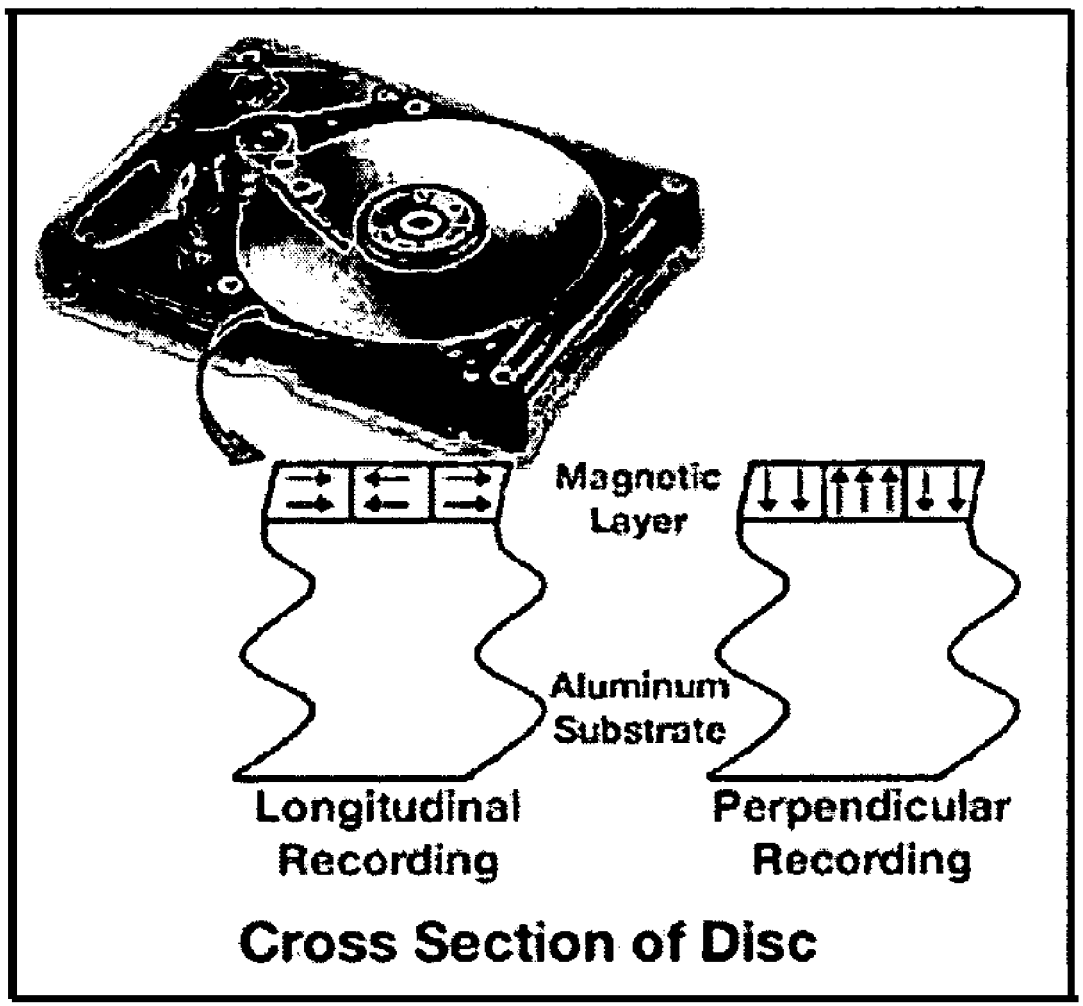
FIG. 1 schematically shows a magnetic disk recording medium comparing longitudinal or perpendicular recording.

Origin of RKKY interaction is polarization of conducting electrons induced by localized spin. One embodiment of this invention has two magnetic layers separated by non-magnetic layer. Atoms of magnetic layers at the interface with non-magnetic layer (localized spins on the interface) polarize conducting electrons in non-magnetic layer. Depending on the thickness of non-magnetic layer exchange interaction can vary from ferromagnetic to anti-ferromagnetic.

Exchange is largely a nearest-neighbor phenomenon that occurs across distances typical of the distance between atoms in a solid (a few angstroms). If there is one atomic interlayer of one material between two layers, then that may be enough (though thicker interlayer could also by used) to destroy or further stabilize the exchange between the two layers separated by the interlayer.

One way to result in an improvement in the signal to noise ratio (SNR) of longitudinal magnetic recording media (for further increasing the recording density) is by decreasing the average grain volume, V, as explained above. The attainable SNR increases as $\sim N^{1/2}$ with the number of grains, N, per recorded transition as well as with decreasing $M_r t$ of the recording media. $M_r t$ is the product of the remanent magnetization, $M_r$, and the film thickness, t, of the magnetic material. Both ways to increase SNR lead to a smaller energy barrier, $K_u V$, which resists magnetization reversal due to thermal agitation. The volume reduction can be partially offset by increasing the anisotropy of the material used in the media, but the available writing fields limit the anisotropy increase. Also, anti-ferromagnetically coupled (AFC) media could be used for increasing recording density of longitudinal magnetic recording media.

The signal voltage produced by the magnetic media is proportional to $M_r t$, which contains all the media parameters. For example, in the case of a particulate media, the particles of the magnetic material are relatively apart and have low $M_r$; hence, such a media would require a large film thickness of the magnetic layer to produce a high $M_r t$. On the other hand, a film using materials in which approximately 100% of the material is magnetic can give adequate signal voltage with even a thin film because the $M_r t$ of such a film can be sufficiently large.

In AFC media the main recording layer, ML, is anti-ferromagnetically coupled across a Ru spacer layer with a magnetic stabilization layer, SL. Thus, the stability of the main recording layer increases due to the coupling with a SL and due to the decrease of the demagnetization field that the main layer experience. This increase in stability of the main layer can be traded off against the decreasing the average magnetic grain volume in the main recording layer. However, the net $M_r t$ of this media is reduced (net $M_r t = (M_r t)_{ML} - (M_r t)_{SL}$) that will cause increase in the effective electronic noise and reduction in total SNR (total SNR=Media SNR+Electronic SNR).

This invention utilizes a new interlayer design for magnetic media that consists of up to three intermediary layers, $IL_1$, $IL_2$, $IL_3$. If $IL_1$ is ferromagnetic this longitudinal media has very similar structure to those of AFC media (thus the media of this invention is also called a quasi AFC media or QAFC media) with a two major differences: (1) $IL_1$ is much thinner than SL in AFC media and thus it does not reduce signal from the main layer significantly; and (2) $IL_3$ is much thicker than the interface layers used in AFC media for increasing AF coupling. Enhanced coupling between magnetic grains in $IL_3$ is used to improve stability and overwrite. In AFC media stability of ML is improved due to the AF coupling with SL. On the other hand, in this new media design the $IL_1$ is too thin to make any significant contribution to media stability.

This invention is based on the discovery that improved high areal recording density, thin-film, QAFC magnetic media having improved performance, e.g., enhanced signal voltage can be reliably and controllably manufactured so as to obtain benefits of AFC media and longitudinal media. The benefit of the former is smaller grain size primarily due to a Ru spacer layer, and weakly due to coupling, while the benefit of the latter is a high signal voltage. The recording results show that the new design of this invention produces improved stability and writability in comparison to longitudinal media. Also, the signal to noise ratio, SNR, is better than the SNR of AFC media. While the exact mechanism for the improvements observed by the media of this invention is not well understood, arguably, the improved performance of the media of this invention could be due to microstructure changes resulting from the new interlayer design.

When referring to magnetic recording media, there are two basic types: oriented and isotropic. Isotropic media has the magnetic layer and under-layers, which are used to control the crystallographic orientation of the magnetic layer, applied to a non-preferentially polished substrate. Oriented media has a scratch pattern or texture on the disc surface. The texture improves magnetic orientation and enhances film performance by initiating grain growth. Also, the texture causes magnetic properties in down-track and cross-track directions to be different, which could greatly increase media signal-to-noise ratio, thereby greatly improving media performance and density. To texture the surface of a glass substrate, seedlayer materials such as a nickel phosphorus layer is applied, which is then textured. This recording media of this invention could be oriented or isotropic, though oriented media using textured substrate is preferred. The substrate could be a glass substrate or aluminum substrate, preferably with a NiP coating.

Figure 2A:
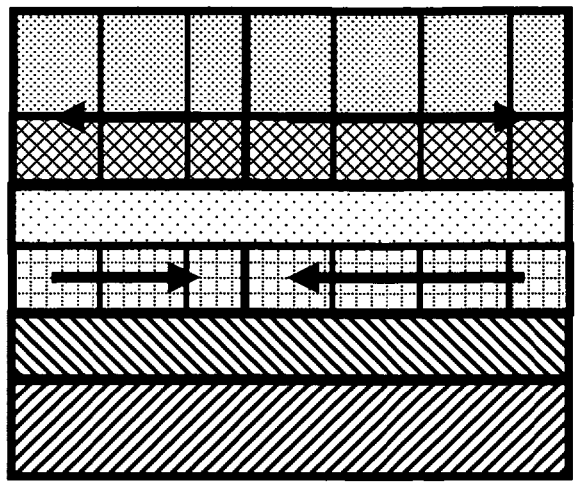
FIG. 2(a) shows a new interlayer design for magnetic media. Arrows represent the directions of magnetic moments across the stack in absence of external field (remanent state).

FIG. 2(a) shows a simplified cross-sectional view of an embodiment of this invention. Arrows represent the directions of magnetic moments across the stack in absence of external field (remanent state). The film structure of the magnetic media could include the following layers:

(1) Substrate, which could optionally have a non-oxidized or oxidized NiP seedlayer. An additional seedlayers composed of amorphous or fine grain material such as NiAl, CrTi may be present.

(2) Under layers capable of controlling the crystallographic texture of Co-based alloys.

Figure 2B:
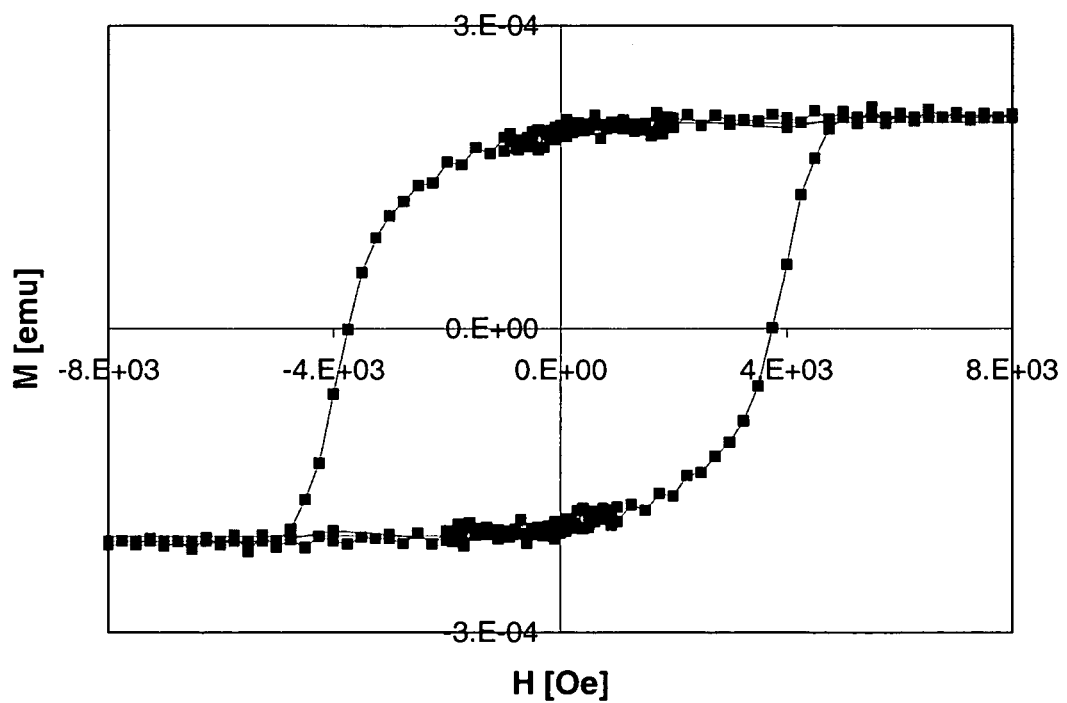
FIG. 2(b) shows the MH loop of the new media design. In this media ferromagnetic interlayer, $IL_1$, (stabilizing layer) is so thin that MH loop looks similar to that of single magnetic layer longitudinal media.

(3) An interlayer structure that could have the following layer design:

(a) The first intermediary layer, $IL_1$, having hexagonal close pack, hcp, crystal structure and comprising of alloy materials selected from the group consisting of Co with one or more added elements selected from Cr, Pt, Ta, B, Ti, Zr, Hf, Mo, Ru, Si, Ge, Nb, Fe, Ni and combinations thereof. This layer may or may not be ferromagnetic. Preferably, the interlayer, $IL_1$, (stabilizing layer) is so thin (less than 1 nm, but preferably about 0.5 nm) that the MH loop is substantially similar to that of longitudinal media as shown in FIG. 2(b).

(b) The second intermediary layer, $IL_2$, having hexagonal close pack, hcp, crystal structure and capable of providing RKKY coupling between interlayers, $IL_1$ and $IL_3$, when $IL_1$ and $IL_3$ are magnetic layers. This layer can include Ru, Re and their alloys. This layer may also contain minor amounts of at least one bcc-structured element selected from the group consisting of W, Mo, Ta, Nb, Cr, and V. This layer is at least one atomic layer thick, preferably, about 0.01 to 3 nm.

(c) The third intermediary layer, $IL_3$, having hexagonal close pack, hcp, crystal structure and comprising of alloy materials selected from the group consisting of Co with one or more added elements selected from Cr, Pt, Ta, B, Ti, Zr, Hf, Mo, Ru, Si, Ge, Nb, Fe, Ni and combinations thereof. This layer may or may not be ferromagnetic.

(4) A top magnetic layer/s, TL, that could have an alloy material selected from the group consisting of CoCr; CoCr with one or more added elements selected from Pt, Ta, B, Mo, Ru, Si, Ge, Nb, Fe, Ni and combinations thereof.

In general Cr-rich magnetic layer is located between layer (3) and Cr-diluted magnetic layer.

Preferably, the top magnetic layer may include:

(a) Cr-rich magnetic layer/s that comprise an alloy material selected from the group consisting of $Co_{100-\delta}Cr_\delta$; with one or more added elements selected from Pt, Ta, B, Mo, Ru, Si, Ge, Nb, Fe, Ni and combinations thereof. The concentration of Cr, $\delta$, in this layer should be $\delta \geq 15$ (example: $Co_{64}Cr_{16}Pt_{12}B_8$ Cr concentration larger than 15 atomic %), and (b) Cr-dilute magnetic layer/s that comprise an alloy material selected from the group consisting of CoCr; CoCr with one or more added elements selected from Pt, Ta, B, Mo, Ru, Si, Cu, Ag, Ge, Nb, Fe, Ni and combinations thereof. This layer should have lower Cr concentration and higher $M_s$ and $H_k$ than layer a).

Instead, of a NiP seedlayer, the layer on the substrate could be any Ni-containing seedlayer such as a NiNb seedlayer, a Cr/NiNb seedlayer, or any other Ni-containing seedlayer. Optionally, there could be an adhesion layer between the substrate and the seedlayer. The surface of the Ni-containing seedlayer could be optionally oxidized.

Embodiments of this invention include deposition of an underlayer, such as Cr or a Cr-alloy underlayer, e.g., CrMo, on the Ni-containing seedlayer. Embodiments of this invention include the use of any of the various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer. In a preferred embodiment, the magnetic layer is Co—Cr—Pt—B. In another embodiment, the Co—Cr—Pt—B comprises at least 6-26 atomic percent Cr, 5 to 21 atomic percent Pt, 2 to 18 atomic percent B, and Co in the balance. In one embodiment, the top magnetic layer of FIG. 2(a) is in the range of 10-50 nm thick, preferably about 20 nm thick, and the amount of Cr in the magnetic layer varies discontinuously or continuously across the thickness to form discrete Cr-rich and Cr-dilute layers or a continuous variation in Cr-concentration across the thickness of the magnetic layer. Preferably, the Cr-rich layer or Cr-rich phase of the magnetic layer is adjacent to the intermediary layer $IL_3$ in FIG. 2(a) though in other embodiments the Cr-dilute or Cr-dilute phase could be adjacent to the intermediary layer $IL_3$.

In a preferred embodiment, the thickness of the seedlayer is about 20 Å to about 2000 Å, the thickness of the underlayer is about 10 Å to about 1000 Å, and the thickness of the magnetic layer is about 40 Å to about 300 Å. In another preferred embodiment, the thickness of the adhesion layer is about 3 Å to about 1000 Å, the thickness of the seedlayer is about 20 Å to about 2000 Å, the thickness of the underlayer is about 10 Å to about 1000 Å, and the thickness of the magnetic layer is about 40 Å to about 300 Å.

In a preferred embodiment, the thickness of the adhesion layer, if present, is 3 Å to about 250 Å, preferably between 5 Å and 150 Å, and most preferably about 20 Å. In a preferred embodiment, the thickness of the seedlayer is 20 Å to about 1600 Å, preferably between 40 Å and 1200 Å. In a preferred embodiment, the thickness of the underlayer is 12 Å to about 500 Å, preferably between 15 Å and 250 Å, and most preferably about 25 Å. In a preferred embodiment, the thickness of the magnetic layer is 55 Å to about 250 Å, preferably between 80 Å and 225 Å, and most preferably about 170 Å. In a preferred embodiment, the thickness of the protective layer is 10 Å to about 300 Å, preferably between 20 Å and 60 Å, and most preferably about 30 Å. The protective layer is made of hydrogenated carbon ($CH_x$).

The magnetic recording medium has a remanent coercivity of about 2000 to about 10,000 Oersted, and an $M_r t$ (product of remanance, Mr, and magnetic layer thickness, t) of about 0.15 to about 2.0 memu/cm². In a preferred embodiment, the coercivity is about 2500 to about 9000 Oersted, more preferably in the range of about 3000 to about 6000 Oersted, and most preferably in the range of about 3500 to about 5000 Oersted. In a preferred embodiment, the $M_r t$ is about 0.2 to about 1 memu/cm², more preferably in the range of about 0.25 to about 0.45 memu/cm², and most preferably in the range of about 0.27 to about 0.4 memu/cm².

Figure 3:
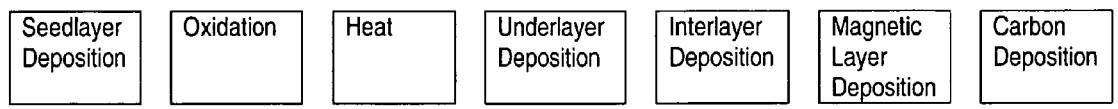
FIG. 3 is a schematic of the process for manufacturing the media.

An apparatus for manufacturing magnetic recording media in accordance with the embodiments of the present invention is schematically illustrated in FIG. 3. The disk substrates travel sequentially through the deposition stations. The disks pass through stations for seedlayer deposition, oxidation, heating, underlayer deposition, interlayer deposition and magnetic layer deposition. The disks are then passed to the protective carbon overcoat deposition station. Other embodiments would require variations to the process of FIG. 3 using well-known processing techniques or structures that are not described herein.

Almost all the manufacturing of a disk media takes place in clean rooms where the amount of dust in the atmosphere is kept very low, and is strictly controlled and monitored. After one or more cleaning and texturing processes on a non-magnetic substrate, the substrate has an ultra-clean surface and is ready for the deposition of layers of magnetic media on the substrate.

Each of the layers constituting magnetic recording media of the present invention, except for a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The lubricant layer is typically provided as a topcoat by dipping of the medium into a bath containing a solution of the lubricant compound, followed by removal of excess liquid, as by wiping, or by a vapor lube deposition method.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some particulates formation on the post sputter disks. These particulates need to be removed to ensure that they do not lead to the scratching between the head and substrate. Thus, a lube is preferably applied to the substrate surface as one of the topcoat layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

EXAMPLES

Longitudinal media, AFC media and QAFC media were prepared with following media structures:

Longitudinal media: Cr based underlayers/IL/TL
AFC media: Cr based underlayers/BL/Ru/IL/TL
New media design, QAFC: Cr based underlayers/$IL_1$/$IL_2$ (Ru)/$IL_3$/TL The $IL_1$ in the new media design is much thinner than BL in AFC and similar in composition. $IL_3$ in QAFC is several times thicker than IL in AFC and similar in composition. TL has the same composition in all three media structures. $IL_3$ in QAFC and IL in longitudinal media have similar thickness and composition. However, the relative contribution of $IL_1$ to total $M_r t$ of QAFC is significantly larger than the relative contribution of IL to total $M_r t$ of longitudinal media. In longitudinal media IL grows on top of a Cr-rich layer with bcc crystal structure. This causes formation of a thin transition layer at the interface between bcc and hcp crystal structures that does not contribute to media $M_r t$. On the other hand, in QAFC, $IL_1$ is grown on top of a layer with hcp crystal structure (Ru) and the full thickness of $IL_1$ contributes to $M_r t$.

Experimental procedure: The media designs were sputtered on Glass/NiP substrates. The thickness of Ru spacer layers was ~0.6 nm to achieve maximum anti-ferromagnetic coupling between $IL_1$ and $IL_3$/TL. A ~35 Å carbon overcoat was applied using magnetron sputtering to protect the films from corrosion. For longitudinal and AFC media the heat was adjusted to obtain similar media coercivities.

Recording data are summarized in Table 1, Table 2 and Table 3.

TABLE 1

| Description | Hcr [Oe] | MrT [memu/cm²] | S* | Mrt/Hcr [nm] | Amplitude [mV] | PW50 [u"] | OW (dB) |
|---|---|---|---|---|---|---|---|
| Conventional media | 4644 | 0.34 | 0.84 | 9.2 | 1298 | 3.13 | −37.6 |
| 2L AFC | 4534 | 0.33 | 0.86 | 9.3 | 1249 | 3.03 | −35 |
| QAFC | 4400 | 0.34 | 0.88 | 9.7 | 1454 | 3.09 | −41 |

TABLE 2

| Description | SNR [dB] | SNRe [dB] | SNRm [dB] | SNRm (dc) [dB] | SNRm (tran) [dB] |
|---|---|---|---|---|---|
| Conventional media | 12 | 17.7 | 14.1 | 19 | 15.8 |
| 2L AFC | 11.9 | 17.5 | 14.2 | 19.5 | 15.5 |
| QAFC | 12.3 | 18.1 | 14.3 | 21.1 | 15.3 |

TABLE 3

| Description | Thermal decay [%/decade] |
|---|---|
| Conventional media | 2.0 |
| 2L AFC | 1.0 |
| QAFC | 1.3 |

Recording performance: Recording performance of longitudinal and AFC media was similar. In QAFC the contribution of interlayer, $IL_3$, to total $M_r t$ of QAFC was significantly larger than the contribution of IL in the longitudinal and AFC media. $IL_3$ and IL have granular structure, i.e., Co-rich grains separated by Cr-rich grain boundary. Cr-rich grain boundary in $IL_3$ is expected to be weakly magnetic resulting in increase in direct exchange interaction between magnetic grains in IL/TL film structure in QAFC. $M_s$ of $IL_3$ and IL is larger than $M_s$ of TL leading to a thinner total thickness of magnetic layers in QAFC ($IL_3$+TL). $H_k$ (anisotropy field) of $IL_3$ and IL in investigated media structures were lower than $H_k$ of TL, which explains lover $H_{cr}$ of QAFC (QAFC has the largest contribution of $IL_3$ of all three investigated media structures).

The (1) increase in the direct exchange interaction and (2) thinner total thickness of magnetic layers in QAFC leads to (see Table 1, Table 2 and Table 3): (a) Improved OW (due to both (1) and (2)); (b) Lower dc noise, i.e., SNRm (dc) increases (due to both (1) and (2)); (c) High transition noise, i.e., SNRm (tran) is reduced due to (1); (d) Improved thermal stability in comparison to longitudinal media due to (1); and (e) High signal due to (2), resulting in reduced spacing loss in the thinner media. Overall QAFC shows improvement in SNR, OW and higher signal for the same media $M_r t$ making this media design attractive for future applications.

Increase in inter-granular interaction in magnetic layers can be used to improve stability of recording media. Table 4 shows three different media designs: 1) QAFC with a thicker $IL_3$, $t(IL_3)$=1.5 nm, and a thinner TL, 2) QAFC with a thinner $IL_3$, $t(IL_3)$=0.5 nm, and a thicker TL, 3) QAFC with a thinner $IL_3$, $t(IL_3)$=0.5 nm, and a thicker TL, sputtered at lower temperature to obtain the same Hc as media 1). Note that coercivity in media design 1) is lower than that of media design 2) because of lower $H_k$ of $IL_3$ in comparison to $H_k$ of TL. We used the same sputtering conditions for media designs, 1) and 2), so it is expected that both media have the same grain size. The decay rate of both media, 1) and 2), is the same indicating that additional coupling that is induced by increasing of $IL_3$ thickness in media 1) can compensate for lower $H_k$ of this media. In the case of media design 3) we reduced the substrate temperature to get similar $H_c$ of this design to that of media design 1). However, thermal stability of QAFC is in this case compromised.

TABLE 4

| Description | Hcr [Oe] | MrT [memu/cm²] | S* | Decay [%/decade] |
|---|---|---|---|---|
| 1) QAFC t(IL₃) = 1.5 nm | 4440 | 0.35 | 0.88 | 1.3 |
| 2) QAFC t(IL₃) = 0.5 nm | 4860 | 0.35 | 0.86 | 1.2 |
| 3) QAFC t(IL₃) = 0.5 nm | 4360 | 0.34 | 0.84 | 2.3 |

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A magnetic recording medium comprising a substrate, an interlayer and a magnetic layer, the interlayer comprising at least a first intermediary layer, a second intermediary layer and a third intermediary layer, wherein the first intermediary layer or the third intermediary layer is non-magnetic and the second intermediary layer has a hexagonal close pack crystal structure,
   wherein the magnetic layer comprises (a) a Cr-rich layer comprising Cr and (b) a Cr-dilute layer comprising Cr, wherein the Cr-rich layer comprises a greater atomic percent Cr than the Cr-dilute layer.

2. The medium of claim 1, wherein the first intermediary layer has a hexagonal close pack crystal structure and comprises Co or a Co alloy with at least one element selected from the group consisting of Cr Pt, Ta, B, Ti, Zr, Hf, Mo, Ru, Si, Ge, Nb, Fe, Ni, Ag, Au and combinations thereof.

3. The medium of claim 2, wherein the third intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

4. The medium of claim 3, further comprising a non-oxidized or oxidized NiP or CoW layer on the substrate.

5. The medium of claim 2, wherein the magnetic layer comprises CoCr or an alloy of CoCr with at least one element selected from the group consisting of Pt, Ta, B, Mo, Ru, Si, Ge, Nb, Fe, Ni, Cu, Ag, Au and combinations thereof.

6. The medium of claim 2, wherein the first intermediary layer has a thickness of less than 1 nm and the second intermediary layer has a thickness of about 0.01 to 3 nm.

7. A method of manufacturing a magnetic recording medium comprising depositing an interlayer on a substrate and depositing a magnetic layer on the interlayer, the interlayer comprising at least a first intermediary layer, a second intermediary layer and a third intermediary layer, wherein the first intermediary layer or the third intermediary layer is non-magnetic and the second intermediary layer has a hexagonal close pack crystal, wherein the magnetic layer comprises (a) a Cr-rich layer of CoCr or CoCr with one or more elements selected from the group consisting of Pt, Ta, B, Mo, Ru, Si, Ge, Nb, Fe, Ni, Cu, Ag, Au, where in Cr concentration is greater than or equal to 17 atomic %, and (b) a Cr-dilute layer of CoCr or CoCr with one or more elements selected from the group consisting of Pt, Ta, B, Mo, Ru, Si, Cu, Ag, Ge, Nb, Fe, Ni, Au, where in Cr concentration is less than 17 atomic %.

8. The method of claim 7, wherein the first intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Cu, Ag, Au, and combinations thereof, and further wherein the third intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Cu, Ag, Au, and combinations thereof.

9. The method of claim 7, wherein the first intermediary layer has a thickness of less than 1 nm and the second intermediary layer has a thickness of about 0.01 to 3 nm.

10. The medium of claim 1, wherein the second intermediary layer having a hexagonal close pack crystal structure comprises a material selected from the group consisting of Ru, Re and alloys thereof.

11. The medium of claim 1, wherein the second intermediary layer comprises at least one bcc-structured element selected from the group consisting of W, Mo, Ta, Nb, Cr, and V.

12. The medium of claim 1, wherein the second intermediary layer having a hexagonal close pack crystal structure comprises Ru or a Ru alloy that consist of over 80 at. % of Ru and the rest of elements selected from the group consisting of Ti, V, Cr, Zr, Nb, Mo, Rh, Hf, Ta, W and Ir.

13. A magnetic recording medium of claim 1 wherein the magnetic layer comprises (a) a Cr-rich layer of CoCr or CoCr with one or more elements selected from the group consisting of Pt, Ta, B, Mo, Ru, Si, Ge, Nb, Fe, Ni, Cu, Ag, Au, where in Cr concentration is greater than or equal to 17 atomic %, and (b) a Cr-dilute layer of CoCr or CoCr with one or more elements selected from the group consisting of Pt, Ta, B, Mo, Ru, Si, Cu, Ag, Ge, Nb, Fe, Ni, Au, where in Cr concentration is less than 17 atomic %.

14. The medium of claim 13, wherein the first intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

15. The medium of claim 13, wherein the second intermediary layer has a hexagonal close pack crystal structure and comprises a material selected from the group consisting of Ru, Re and alloys thereof.

16. The medium of claim 13, wherein the third intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

17. The medium of claim 1, wherein the first intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

18. The medium of claim 1, wherein the second intermediary layer having a hexagonal close pack crystal structure comprises a material selected from the group consisting of Ru, Re and alloys thereof.

19. The medium of claim 1, wherein the third intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

20. The medium of claim 10, wherein the first intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

21. The medium of claim 10, wherein the second intermediary layer having a hexagonal close pack crystal structure comprises a material selected from the group consisting of Ru, Re and alloys thereof.

22. The medium of claim 10, wherein the third intermediary layer has a hexagonal close pack crystal structure and comprises Co or a Co alloy with at least one element selected from the group consisting of Cr, Pt, Ta, B, Ti, Zr, Hf, Mo, Ru, Si, Ge, Nb, Fe, Ni, Ag, Au and combinations thereof.

23. The medium of claim 15, wherein the second intermediary layer further comprises at least one bcc-structured element.

24. The medium of claim 18, wherein the second intermediary layer further comprises at least one bcc-structured element.

25. The medium of claim 21, wherein the second intermediary layer further comprises at least one bcc-structured element.

26. The medium of claim 23, wherein the at least one bcc-structured element selected from the group consisting of W, Mo, Ta, Nb, Cr, and V.

* * * * *